(12) United States Patent
Kumano

(10) Patent No.: US 6,640,678 B2
(45) Date of Patent: Nov. 4, 2003

(54) LATHE WITH TWO-OPPOSED SPINDLES

(75) Inventor: Satoru Kumano, Wajima (JP)

(73) Assignee: Nakamura-Tome Precision Industry Co., Ltd., Ishikawa (JP)

( * ) Notice: Subject to any disclaimer, the term of this patent is extended or adjusted under 35 U.S.C. 154(b) by 0 days.

(21) Appl. No.: 10/181,155

(22) PCT Filed: Jan. 18, 2001

(86) PCT No.: PCT/JP01/00291

§ 371 (c)(1),
(2), (4) Date: Aug. 14, 2002

(87) PCT Pub. No.: WO01/53024

PCT Pub. Date: Jul. 26, 2001

(65) Prior Publication Data

US 2003/0029286 A1 Feb. 13, 2003

(30) Foreign Application Priority Data

Jan. 18, 2000 (JP) .................................. 2000-009206

(51) Int. Cl.[7] .............................. B23B 7/00; B23B 9/00
(52) U.S. Cl. .............................. 82/129; 82/121; 82/117
(58) Field of Search .......................... 82/129, 121, 128, 82/132, 138, 148, 146, 153, 154, 159, 173, 123, 117

(56) References Cited

U.S. PATENT DOCUMENTS

| | | | | |
|---|---|---|---|---|
| 2,473,306 A | * | 6/1949 | Schreiber ..................... | 82/129 |
| 4,571,796 A | | 2/1986 | Sellner et al. | |
| 4,612,832 A | | 9/1986 | Ushigoe et al. | |
| 5,117,544 A | | 6/1992 | Kousaku et al. | |
| 5,127,140 A | | 7/1992 | Oiwa et al. | |
| 5,343,604 A | * | 9/1994 | Takagi ......................... | 82/129 |
| 5,644,961 A | * | 7/1997 | Nishio et al. ................. | 82/129 |
| 5,896,794 A | * | 4/1999 | Trautmann .................... | 82/129 |

FOREIGN PATENT DOCUMENTS

| | | |
|---|---|---|
| EP | 0 289 333 A2 | 11/1988 |
| JP | 60-141402 A2 | 7/1985 |
| JP | A 3-208501 | 9/1991 |
| JP | A 03-222012 | 10/1991 |
| JP | A 3-251301 | 11/1991 |
| JP | A 4-283003 | 10/1992 |
| JP | A 5-31601 | 2/1993 |
| JP | A 5-345203 | 12/1993 |
| JP | 6-702 A | 1/1994 |
| JP | 6-8001 A | 1/1994 |
| JP | A 7-500056 | 1/1995 |
| JP | A 8-126901 | 5/1996 |
| JP | 11-347801 A | 12/1999 |

OTHER PUBLICATIONS

U. S. patent application Ser. No. 09/888,542, Hirose et al., filed Jan. 26, 2001.

* cited by examiner

Primary Examiner—Willmon Fridie, Jr.
(74) Attorney, Agent, or Firm—Oliff & Berridge PLC

(57) ABSTRACT

There is provided a multi-turret lathe with two opposed spindles which is capable of machining a workpiece more effectively. The lathe with two opposed spindles includes: a first spindle (2); a second spindle (4) located opposite to the first spindle on the same axis and movable toward and away from the first spindle; and a set of two tool turrets (8a and 8c) which machines a workpiece cooperating with the first spindle, and another set of two tool turrets (8b and 8d) which machines a workpiece cooperating with the second spindle, and the two tool turrets in each of the sets are disposed opposite to each other about a spindle axis (B). Each of the four tool turrets is mounted on a tool slide which is movable and positionable in the direction of spindle axis and also in the direction perpendicular to the spindle axis. This enables each of the four tool turrets to be movable from a position to machine a workpiece held on one of the spindles and another position to machine a workpiece held on the other spindle.

8 Claims, 5 Drawing Sheets

LATHE WITH TWO-OPPOSED SPINDLES

TECHNICAL FIELD

The present invention relates to a multi-turret lathe with two opposed spindles comprising two spindles coaxially opposed to each other and a plurality of tool turrets co-operable with the spindles for machining a workpiece.

BACKGROUND ART

The lathe with two opposed spindles comprising two spindles coaxially opposing to each other is known in the art. The conventional lathes hold one end of a workpiece to machine the workpiece and that end cannot be machined while it is being held. In the lathe with two opposed spindles, however, the partially machined workpiece can be transferred from one spindle to the other, and each of the ends of the workpiece which has been held by a chuck of either one of the spindles can be machined on the same machine.

If the lathe with two opposed spindles includes a plurality of tool turrets, two different machining operations can simultaneously be performed for two workpieces held by two different spindles. This improves the efficiency of working. The tool turrets may be provided with rotary tools such as drills and milling cutters, tailstocks, supporting rollers which support the workpiece at the periphery thereof, and the like. When these tools are mounted on the tool turrets in an appropriate combination, the workpiece can be subjected to a broad type of machining operations.

A lathe with two opposed spindles in a prior art is classified into two-spindle and two-turret type and two-spindle and three-turret type. The two-spindle and two-turret type lathe comprises two spindles and two turrets each cooperating with the corresponding spindle for machining a workpiece. In such an arrangement, a single workpiece held by one of the spindles can be machined by use of two tool turrets. For example, when the workpiece is held at one side by a chuck of one of the spindles, the opposite side of the workpiece may be held by a tailstock which is mounted on a tool turret cooperating with the other spindle for lathe-turning. However, this disables the machining of a workpiece on the other spindle.

In the two-spindle and three-turret type lathe, usually, the third turret is movable from a position in which a workpiece supported by the first spindle is to be machined to another position in which a workpiece supported by the second spindle is to be machined. Each of the first and second spindles can cooperate with two turrets to machine the workpiece as necessary. For example, a workpiece held by one spindle can be lathe-turned or drilled while simultaneously machining the external and internal diameters of the workpiece by use of two turrets on the other spindle.

If a workpiece held by one spindle is machined by use of two tool turrets, a reaction force on the workpiece being machined can be balanced by cutting the workpiece at two positions opposite to each other about the axis of the spindle. This enables various types of machining operations such as machining a shaft by use of a tailstock mounted on one turret, simultaneous cutting of external and internal diameters and so on which could not be performed by the conventional one-turret lathes with one spindle. Furthermore, the efficiency of working can be improved since the workpiece can be machined simultaneously at two positions.

However, the three-turret lathes with two spindles used in the prior art can only use one turret for one spindle when the third turret is used cooperating with the other spindle. Thus, machining using two turrets cannot be performed on the one spindle until the working with the third turret has been completed.

DISCLOSURE OF THE INVENTION

The present invention provides a multi-turret lathe with two opposed spindles which can more effectively machine a workpiece. The present invention can economically realize broad types of machining by providing a reasonable structure in which a tool can be moved and positioned in a direction (Y-axis) orthogonal to the direction of spindle (Z-axis) and the direction of tool cutting (X-axis).

A lathe with two opposed spindles of the present invention comprises: a first spindle 2; a second spindle 4 located opposite to the first spindle on a spindle axis of the first spindle and movable and positionable in a direction of the spindle axis; and a set of two tool turrets 8a and 8c which machines a workpiece cooperating with the first spindle, and another set of two tool turrets 8b and 8d which machines a workpiece cooperating with the second spindle. The two tool turrets in each of the sets are disposed opposite to each other at a forward-downward side and a backward-upward side of the spindle axis B, respectively.

It may be most preferred that each of the four tool turrets in two sets is mounted on a tool slide which is movable and positionable in the directions of Z-axis and X-axis. It may be further preferred that each of the four tool turrets is independently movable from a position to machine a workpiece held by the first spindle to another position to machine a workpiece held by the second spindle. At least one of two opposing tool turrets in one set may include a device for driving rotary tools such as a drill and a milling cutter.

In a more preferred lathe with two opposed spindles of the present invention, may include a second spindle 4 and a first spindle immovable in a direction of spindle axis, the second spindle 4 and the first spindle may be arranged next to each other as viewed from an operator on the machine base. One of the two tool turrets cooperating with each of the spindles may be disposed at a backward-upward side of the spindle axis B while the other of the two tool turrets be disposed at a forward-downward side of the spindle axis. All of the four tool turrets may be movable and positionable in a direction of spindle axis and in a direction perpendicular to the spindle axis.

In a further preferred lathe with two opposed spindles of the present invention, may comprise a device for moving and positioning tool turrets disposed on a backward-upward side of the spindle axis (B), in a direction of Y-axis, and the backward tool turret may include a device for driving a rotary tool. In such a structure, the tool turret disposed on a forward-downward side of the spindle axis B may include no Y-axis moving and positioning device.

Figure 1:
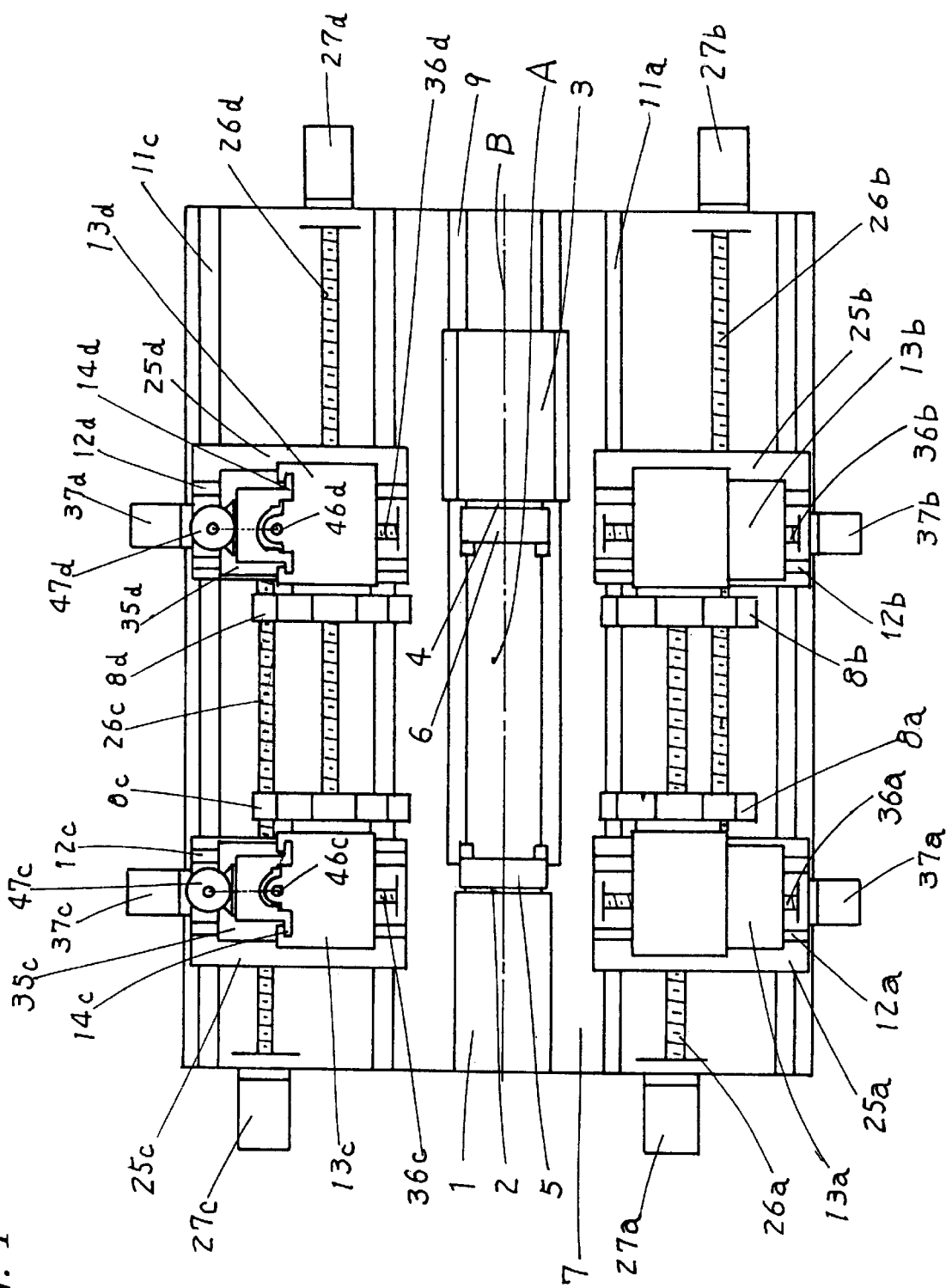
FIG. 1 is a schematic view of a lathe with two opposed spindles according to one embodiment of the present invention, as viewed from section arrows I—I in FIG. 2.

In the drawings: reference numeral 2 denotes a first spindle; 4 a second spindle; 7 a bed; 8a to 8d tool turrets; 9 spindle guides; 11a and 11c Z-axis guides; 12a to 12d X-axis guides; 14 Y-axis guides; A a working region; and B a spindle axis.

BEST MODE FOR CARRYING OUT THE INVENTION

Figure 3:
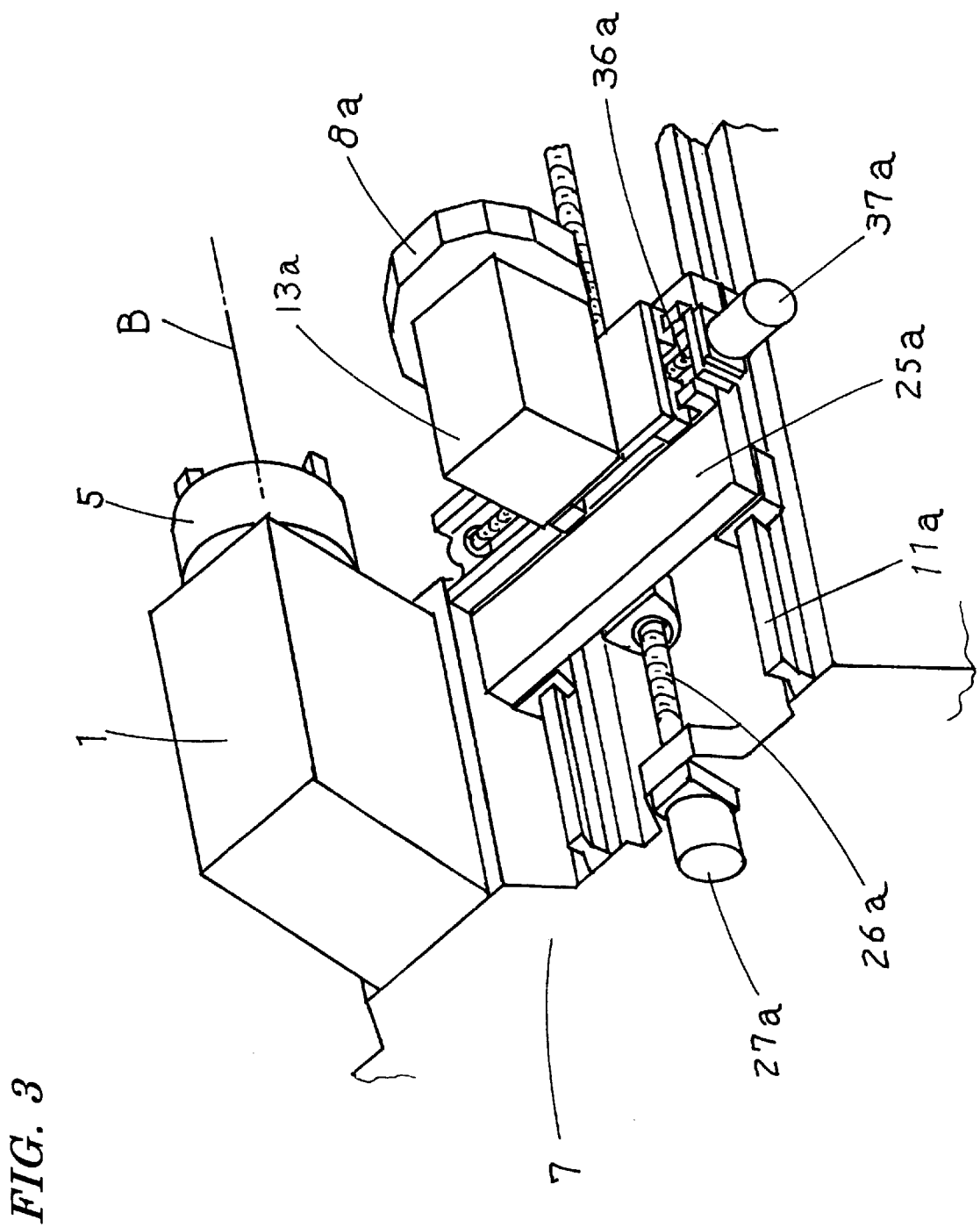
FIG. 3 is a perspective view of a tool slide in the lathe of FIG. 1.

Referring now to FIGS. 1 and 3, a first headstock 1 is stationary in a direction of spindle axis (or Z-axis). The first headstock 1 supports a first spindle 2 for high-speed rotation, low-speed high-torque rotation and indexing movement. A second spindle 4 is disposed opposed to the first spindle 2 on the same spindle axis B and is supported by a second headstock 3. The second headstock 3 can be moved toward and away from and positioned relative to the first spindle 2 along spindle guides 9 on a bed 7. The second spindle 4 can be high-speed rotated, low-speed and high-torque rotated and indexed by a drive motor (not shown), as in the first spindle 2. The opposing ends of the first and second spindles 2, 4 include first and second chucks 5, 6 mounted thereon, respectively.

Figure 2:
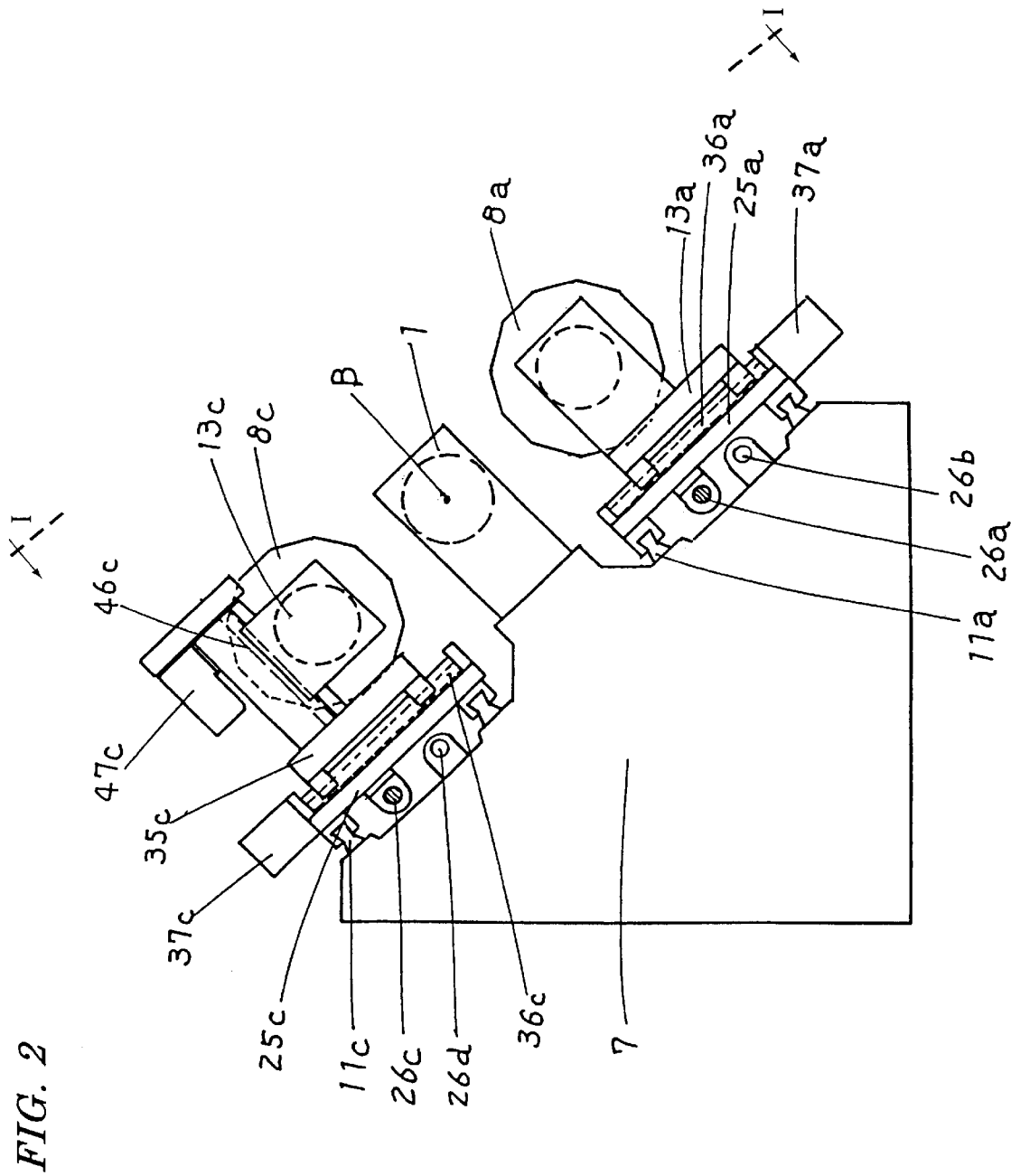
FIG. 2 is a side view of the lathe shown in FIG. 1.

The first and second spindles 2 and 4 are positioned laterally relative to each other about a working area A, as viewed from an operator. As been clearly shown in FIG. 2, the bed 7 is of so-called slant type in which a bed 7 is sloped lower toward the side of operator. Forward and backward Z-axis guides 11a and 11c are disposed parallel to the spindle axis B on the forward and backward sides of the spindle axis of the bed, respectively. Since the bed 7 is of slant type, the forward Z-axis guide 11a is positioned on the forward-downward side of the spindle axis B while the backward Z-axis guide 11c is positioned on the backward-upward side of the spindle axis B, as viewed from the operator.

Slides 25a and 25b are slidably mounted on the Z-axis guide 11a on the sides of the first and second spindles, respectively, while slides 25c and 25d are slidably mounted on the Z-axis guide 11c on the sides of the first and second spindles, respectively. Z-axis feed screws 26a and 26b are operably supported by the bed parallel to the Z-axis guide 11a while Z-axis feed screws 26c and 26d are operably supported by the bed parallel to the Z-axis guide 11c. Each of the Z-axis feed screws is operably connected to the corresponding one of Z-axis feed motors 27a, 27b, 27c and 27d. Each of the Z-axis feed screws 26a, 26b, 26c and 26d is threadingly screwed into the corresponding one of the slides 25a, 25b, 25c and 25d.

The slides respectively include an X-axis guide 12a, 12b, 12c and 12d; an X-axis feed screw 36a, 36b, 36c and 36d parallel to the corresponding X-axis guide and an X-axis feed motor 37a, 37b, 37c and 37d connected to the end of the corresponding X-axis feed screw. Each of tool slides 13a and 13b is movably mounted on the corresponding one of the X-axis guides 12a and 12b in the forward slide, and threadingly screwed over the corresponding one of the X-axis feed screws 36a and 36b. Each of X-axis slides 35c and 35d is movably mounted on the corresponding one of the X-axis guides 12c and 12d in the backward slide, and threadingly screwed over the corresponding one of the X-axis feed screws 36c and 36d.

Each of the X-axis slides 35c and 35d is of L-shaped side cross-section and comprises a Y-axis guide 14c or 14d, a Y-axis feed screw 46c or 46d extending parallel to the corresponding one of the Y-axis guides and a Y-axis feed motor 47c or 47d connected to the corresponding one of the Y-axis feed screws. Each of tool slides 13c and 13d is movably mounted on the corresponding one of the Y-axis guides 14c and 14d in each X-axis slide and threadingly screwed over the corresponding one of the Y-axis feed screws 46c and 46d.

The four tool slides thus respectively mounted include a tool turret 8a, 8b, 8c and 8d mounted thereon. The tool turrets 8a and 8b positioned forward are located below the spindle axis B and movable and positionable in the directions of Z- and X-axes. The tool turrets 8c and 8d positioned backward are located above the spindle axis B and movable and positionable in the directions of Z-, X- and Y-axes.

The slides 25a, 25b, 25c and 25d are dimensioned and arranged such that the slides 25a and 25c on the side of the first spindle are retractable from the working region A when the tool turrets 8b and 8d on the side of the second spindle are moved towards the first spindle for machining a workpiece 15a held by the first spindle, and such that the slides 25b and 25d on the side of the second spindle are retractable from the working region A when the tool turrets 8a and 8c on the side of the first spindle are moved towards the second spindle for machining a workpiece 15b held by the second spindle.

The basic workpiece machining operation in the lathe with two opposed spindles thus configured is described below. A workpiece is carried to the working region A by a loader (not shown) or inserted into the working region A through a hollow bore of the first spindle, and then held by the first chuck 5. The workpiece is machined by cutting tools or tailstocks attached to the two tool turrets 8a and 8c on the side of the first spindle.

After the machining operation on the side of the first spindle has completed, the second spindle 4 is then moved to the side of the first spindle. The workpiece is held by the second chuck 6 at the machined end thereof. Next, the first chuck 5 is opened or the first and second spindles are synchronously rotated to separate the machined workpiece by use of a cutting-off tool. Thereafter, the second headstock 3 is moved away from the first headstock 1. Thus, the workpiece is transferred to the side of the second spindle. The workpiece is then machined by cutting tools or tailstocks mounted on the tool turrets 8b and 8d on the side of the second spindle.

After the workpiece has been transferred to the second spindle, another workpiece is loaded on the first spindle. The workpieces are machined on the sides of the first and second spindles by use of two pairs of tool-turrets, respectively.

Figure 4:
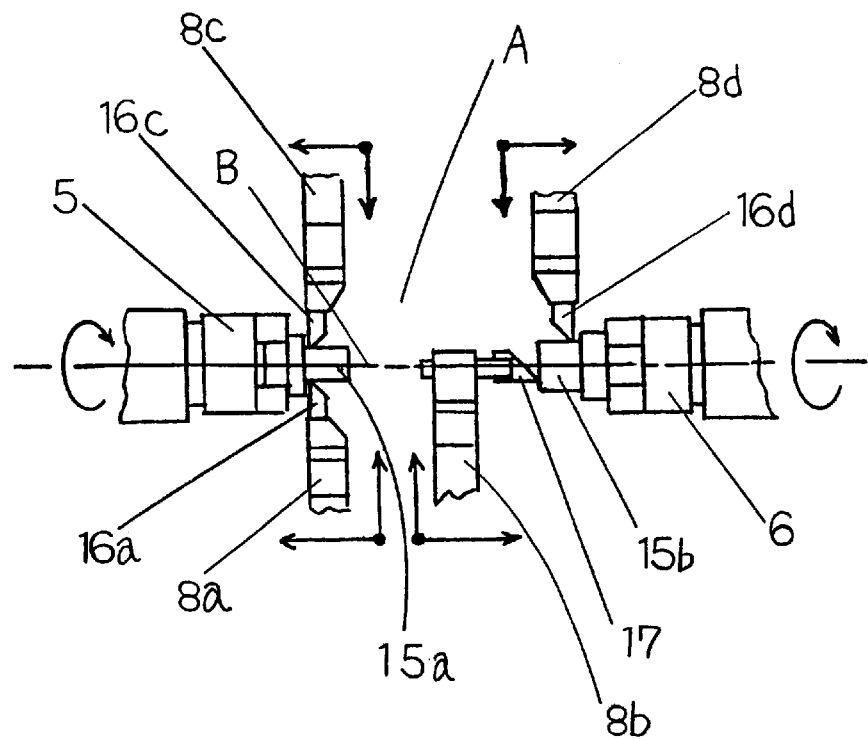
FIGS. 4 to 7 are schematic views illustrating working operations of the lathe according to the aforementioned embodiment as viewed from the section arrows I—I in FIG. 2.

FIGS. 4 to 7 schematically illustrate the machining operations by the lathe of the present invention. In FIG. 4, the workpiece 15a, which is loaded on the first spindle, is machined in a balanced fashion by external-diameter machining tools 16a and 16c respectively mounted on the tool turrets 8a and 8c on the side of the first spindle. The external and internal diameters of the workpiece 15b, which is loaded on the second spindle, is simultaneously machined by an external-diameter machining tool 16d and an internal-diameter machining tool 17 which are respectively mounted on the tool turrets 8b and 8d on the side of the second spindle. The balanced machining operation can avoid lowering the machining accuracy or generating vibration by moving the tools to the workpiece from two directions opposite to each other about the spindle axis B to machine the workpiece so that the machining reactions acting on the workpiece is balanced to prevent deformation in the workpiece due to the heavy cutting.

Figure 5:
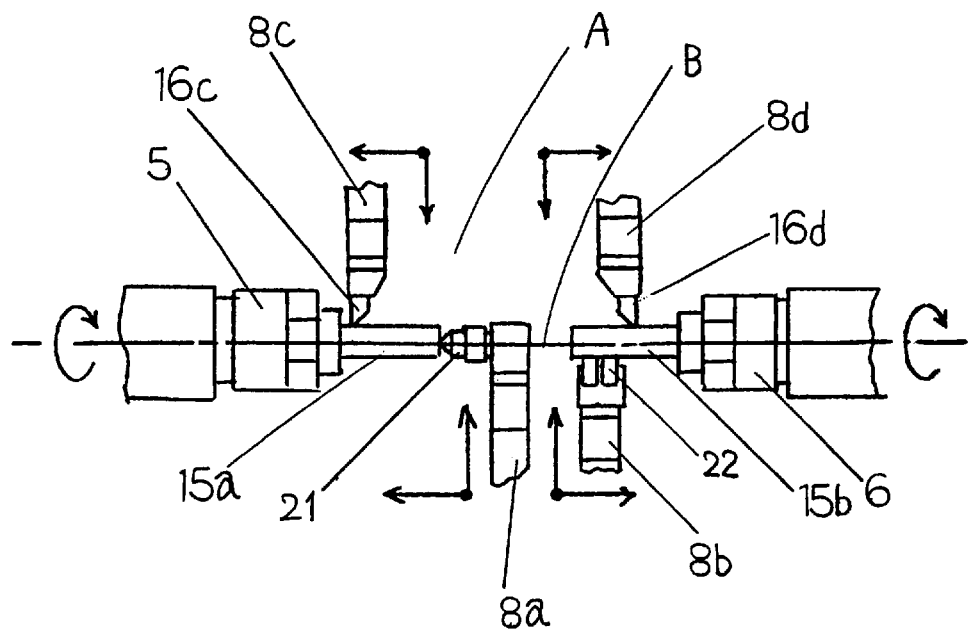

In FIG. 5, the end of the workpiece opposite to the chuck, which is loaded on the first spindle, is machined by a tool 16c mounted on one of the turrets 8c while being held by a tailstock 21 mounted on the other turret 8a on the side of the first spindle. On the other hand, the workpiece 15b, which is loaded on the second spindle, is machined by a tool 16d mounted on the other tool turret 8d while the periphery of the workpiece being supported by a support roller 22 which is mounted on the tool turret 8b on the side of the second spindle.

Figure 6:
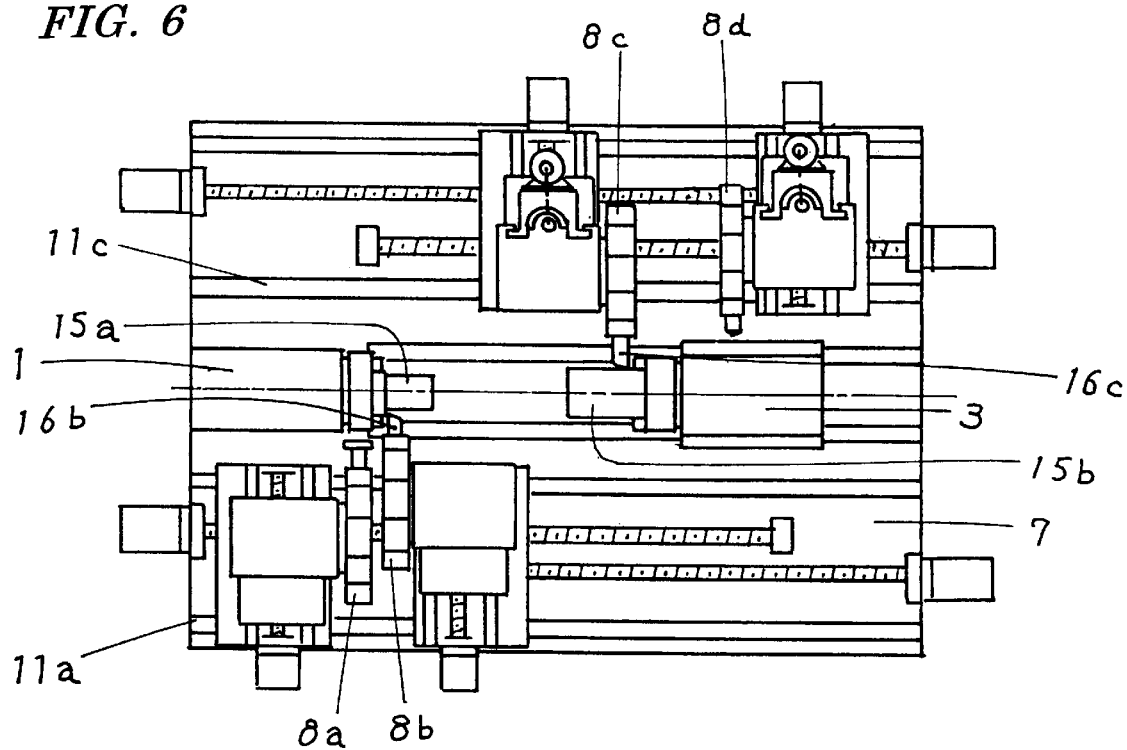

In FIG. 6, the workpiece 15a loaded on the first spindle is machined by the tool 16b mounted on one of the tool turrets 8b on the side of the second spindle while the workpiece 15b loaded on the second spindle is machined by the tool 16c mounted on one of the tool turrets 8c on the side of the first spindle. At this time, the other tool turrets 8a and 8b on the sides of the first and second spindles are being retracted at the end portions of the Z-axis guides 11a and 11c. Such a machining operation generally lowers the efficiency of machining, but is effective in the case where many types of tools are required to machine the workpiece.

Figure 7:
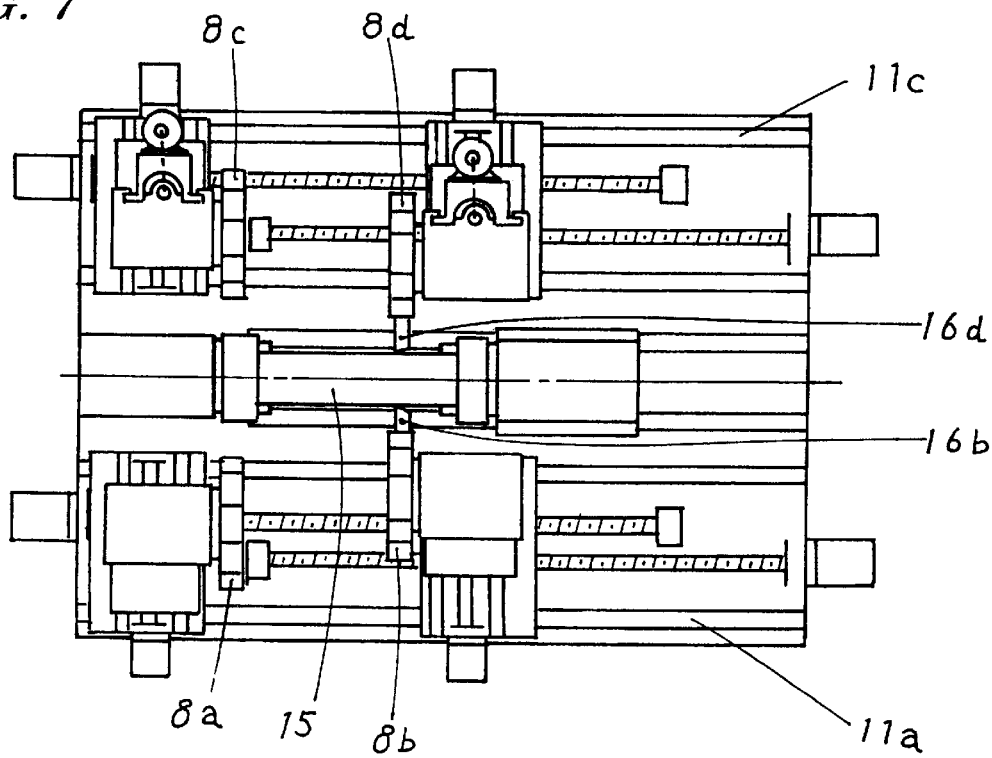

In FIG. 7, an elongated workpiece 15 is held at one end by the first spindle and the other end by the second spindle, and machined in the balanced fashion by the external-diameter machining tools 16b and 16d respectively mounted on the tool turrets 8b and 8d on the side of the second spindle. The tool turrets 8a and 8c on the side of the first spindle are being retracted at the ends of the Z-axis guides 11a and 11c. Such a machining operation is effective in the case of smoothly machining the elongated workpiece from one end to other without leaving any cutting trace.

INDUSTRIAL APPLICABILITY

If a workpiece is machined by a tool mounted on one of the tool turrets while supporting that workpiece by a workpiece supporting member such as a tailstock or support roller mounted on the other tool turret on the side of first and second spindle in the lathe with two opposed spindles as shown in FIG. 4, an elongated shaft material having a larger length compared to a diameter thereof can be machined simultaneously on the sides of the first and second spindles. This can improve the efficiency of machining the shaft material.

If two tool turrets cooperating with the first and second spindles, respectively, are simultaneously used as shown in FIG. 5, the efficiency of machining can be improved. When the balanced machining operation is performed for heavy cutting, the efficiency of machining can further be improved.

When a workpiece held on one of the spindles is machined by a tool mounted on a tool turret of the other spindle as shown in FIG. 6, machining requiring various types of tools can be implemented. When the entire length of a workpiece is machined by a tool mounted on a tool turret on the side of the first or second spindle as shown in FIG. 7, the finishing accuracy for surface can further be improved.

In such a structure that the first headstock 1 is stationary as in the lathe of the illustrated embodiment, the rigidity on the side of the first spindle can be increased. This enables the reasonable machining operation matching the order of workpiece delivery in which a workpiece is finished on the side of the second spindle after it has been roughly machined on the side of the first spindle. The structure in which all the four tool turrets are independently movable and positionable in the direction of spindle axis and also in the direction perpendicular to the spindle axis through CNC device is superior in respect of the freedom of machining, the improvement of machining efficiency and the easy control.

In such a structure that the backward tool turrets are movable in the direction of Y-axis as in the lathe of the illustrated embodiment, they may include rotary tools such as drills and milling cutters mounted thereon to perform a complicated machining operation near the machining center. When only the backward tool turrets are movable in the direction of Y-axis, various broad types of machining operations can be performed by Y-axis movable tools. This can also avoid increasing the manufacturing cost for the machine. Since the Y-axis moving device having its increased height is located backward in the machine, the operability by an operator in the working region can be ensured.

What is claimed is:

1. A lathe with two opposed spindles comprising:
   a bed;
   a first spindle positioned on the bed on a spindle axis;
   a second spindle positioned on the bed and located opposite to the first spindle on the spindle axis and movable toward and away from the first spindle in a first direction of the spindle axis;
   a first set of two tool turrets which machines a first workpiece cooperating with the first spindle; and
   a second set of two tool turrets which machines a second workpiece cooperating with the second spindle,
   wherein the two tool turrets in each of the first and second sets are disposed opposite to each other about the spindle axis, and
   wherein one of the two tool turrets in the second set is movable and positionable on the bed at least in a second direction perpendicular to the first direction, and the other three tool turrets in the first and second sets are movable and positionable on the bed in the first and second directions.

2. The lathe with two opposed spindles as defined in claim 1,
   wherein the first spindle is mounted in a stationary position.

3. The lathe with two opposed spindles as defined in claim 2,
   wherein the two tool turrets in each of the first and second sets are respectively disposed at a forward-downward side and a backward-upward side of the spindle axis as viewed from an operator.

4. The lathe with two opposed spindles as defined in claim 3,
   wherein all of the four tool turrets are movable and positionable in the first and second directions.

5. The lathe with two opposed spindles as defined in claim 4,
   wherein all of the four tool turrets are independently movable from a position to machine the first workpiece held on the first spindle to another position to machine the second workpiece held on the second spindle.

6. The lathe with two opposed spindles as defined in claim 4,
   wherein each of the tool two turrets disposed at the backward-upward side of the spindle axis includes a rotary tool driving device.

7. The lathe with two opposed spindles as defined in claim 4,
   wherein the two tool turrets disposed at the backward-upward side of the spindle axis are movable and positionable in a third direction perpendicular to the first and second directions.

8. The lathe with two opposed spindles as defined in claim 4,
   wherein each of the two tool turrets disposed at the backward-upward side of the spindle axis includes a rotary tool driving device and is movable and positionable in a third direction perpendicular to the first and second directions.

* * * * *